(12) United States Patent
Pichon

(10) Patent No.: US 6,482,485 B1
(45) Date of Patent: Nov. 19, 2002

(54) STRUCTURAL PART INCLUDING A PORTION MADE OF THERMOSTRUCTURAL COMPOSITE MATERIAL COOLED BY FLUID CIRCULATION

(75) Inventor: Thierry Pichon, Avensan (FR)

(73) Assignee: Societe Nationale d'Etude et de Construction de Moteurs d'Aviation-S.N.E.C.M.A., Paris (FR)

( * ) Notice: Subject to any disclaimer, the term of this patent is extended or adjusted under 35 U.S.C. 154(b) by 0 days.

(21) Appl. No.: 09/373,410

(22) Filed: Aug. 12, 1999

(30) Foreign Application Priority Data

Aug. 14, 1998 (FR) .............................. 98 10448

(51) Int. Cl.⁷ ...................... B29D 22/00; B29D 23/00; F28F 3/12; F28F 3/14
(52) U.S. Cl. .................... 428/36.9; 428/34.4; 428/34.5; 165/169; 165/170
(58) Field of Search ............................. 428/36.3, 36.9, 428/34.4; 165/169, 170

(56) References Cited

U.S. PATENT DOCUMENTS 3,823,772 A * 7/1974 Lavering et al. .............. 165/81
5,154,352 A    10/1992 Buckreus ................... 239/127.1
5,520,976 A *  5/1996 Giannetti ..................... 428/36.3
5,645,127 A    7/1997 Enderle et al. .............. 165/176

FOREIGN PATENT DOCUMENTS

DE   196 33 589 A   2/1998
EP   0 486 401 A    5/1992

OTHER PUBLICATIONS

Meriam–Webster's Collegiate Dictionary, tenth edition.*

* cited by examiner

Primary Examiner—Shrive P. Beck
Assistant Examiner—Elena Tsoy
(74) Attorney, Agent, or Firm—Weingarten, Schurgin, Gagnebin & Lebovici LLP

(57) ABSTRACT

The piece made of composite material comprises a plate and a plurality of stiffeners integrally formed with the plate. A metal wall is fixed to the edges of the stiffeners and is provided with passages for circulating the fluid. The plate exposed to the heat flux radiates towards the metal wall through the gaps between the stiffeners, and it also performs the structural function. The invention can be used with structures that are exposed to very high heat flux: the walls of jet combustion chambers, the walls of space plane vehicles, the walls of nuclear fusion reactors.

6 Claims, 2 Drawing Sheets

STRUCTURAL PART INCLUDING A PORTION MADE OF THERMOSTRUCTURAL COMPOSITE MATERIAL COOLED BY FLUID CIRCULATION

BACKGROUND OF THE INVENTION

The invention relates to a structural part including a portion that is made of thermostructural material cooled by fluid circulation.

The invention finds applications in making structures that are exposed in operation to very high heat flux or to aggressive environmental conditions at very high temperatures. It relates in particular to wall structures that are exposed to hot gas flows, e.g. wall structures for the combustion chambers of jet or rocket engines, or wall structures exposed to intense heating, e.g. wall structures of spaceplane vehicles, particularly during atmosphere reentry stages, or indeed wall structures that form heat screens, e.g. in nuclear fusion reactors.

Because of their mechanical properties which make them suitable for constituting structural elements, and because of their capacity to retain these properties up to high temperatures, thermostructural composite materials are commonly used in such applications. Specifically, the materials are carbon-carbon (C/C) composite materials comprising carbon fiber reinforcement densified with a carbon matrix, and ceramic matrix composites (CMCs) comprising reinforcement of refractory fibers (e.g. carbon or ceramic) densified by a ceramic matrix.

When thermostructural composite materials are used under very severe environmental conditions (intense heat flux or an atmosphere that is aggressive, in particular that is oxidizing), it is necessary to limit the surface temperature thereof in order to obtain satisfactory lifetime.

A conventional method of cooling consists in circulating a cooling or "heat-conveying" fluid.

Proposals have been made to form fluid circulation passages within a composite material or in its rear face. Because thermostructural composite materials inevitably present residual porosity because of the way in which they are made, it is necessary to guarantee fluid tightness for the walls of the fluid circulation passages. Reference can be made for example to U.S. Pat. No. 5,583,895.

Proposals have also been made to connect a piece of composite material to a substrate made of metal, e.g. copper, which is cooled by a circulating cooling fluid. A problem which is difficult to solve is that of bonding together two parts that have coefficients of thermal expansion that are significantly different from each other. Reference can be made in particular to document WO 98/03297.

Those parts of known structure therefore present difficult problems of preparation. In addition, they are relatively heavy, which at least in certain applications constitutes a severe drawback.

OBJECT AND BRIEF SUMMARY OF THE INVENTION

An object of the invention is to provide a structural part having a piece of thermostructural composite material cooled by fluid circulation and which can be prepared without raising the same difficulties as in the prior art.

Another object of the invention is to propose such a part which is substantially lighter than in the prior art.

These objects are achieved with a structural part comprising a piece of thermostructural composite material connected to a metal wall provided with fluid circulation passages, in which part the composite material piece comprises a plate and a plurality of stiffeners formed integrally with the plate and situated on one side thereof, being spaced apart from one another, and the metal wall is fixed to the end edges of the stiffeners.

Thus, the piece of thermostructural composite material withstands heat flux and mechanical loads, and radiates from its rear face towards the metal piece through the gaps between the stiffeners. In contrast with the prior art, this decoupling between thermal and mechanical effects simplifies manufacture of the structural part.

In particular, the following advantages are obtained:

the plate of thermostructural composite material stiffened by the stiffeners can itself be thin, so as to constitute merely a skin, imparting lightness to the assembly while still performing its structural function;

since the plate of composite material is exposed to the heat flux via its front face opposite from its face provided with the stiffeners, heat transfer takes place by conduction through the plate, by radiation in the gaps situated between the stiffeners from the back face of the plate to the metal wall, and by forced convection of the fluid travelling in the passages of the metal wall;

the metal wall and the piece of thermostructural composite material are assembled together solely via the end edges of the stiffeners, i.e. in discontinuous manner and at the locations that are furthest from the plate exposed to the heat flux; as a result, thermomechanical stresses are minimized and assembly is simplified;

since the structural function is performed by the piece made of thermostructural composite material, it is possible to use a thin metal wall having fluid circulation pipes fitted thereto, thus minimizing the overall mass of the part; and the piece made of thermostructural composite material and the metal wall can be assembled together during final assembly of the part, e.g. by brazing or mechanically, thereby making it possible to manufacture structures of complex shape, e.g. having dual curvature.

The invention also seeks to provide a method of manufacturing a part having the structure as defined above.

In the method, a fiber preform for the composite material piece is made by assembling together preform elements corresponding to the plate and to the stiffeners, the preform is densified so as to obtain the composite material piece, and the metal wall is fixed to the end edges of the stiffeners.

BRIEF DESCRIPTION OF THE DRAWINGS

In the following description of embodiments of the invention given by way of non-limiting indication, reference is made to the accompanying drawings, in which.

DESCRIPTION OF PREFERRED EMBODIMENTS

Figure 1:
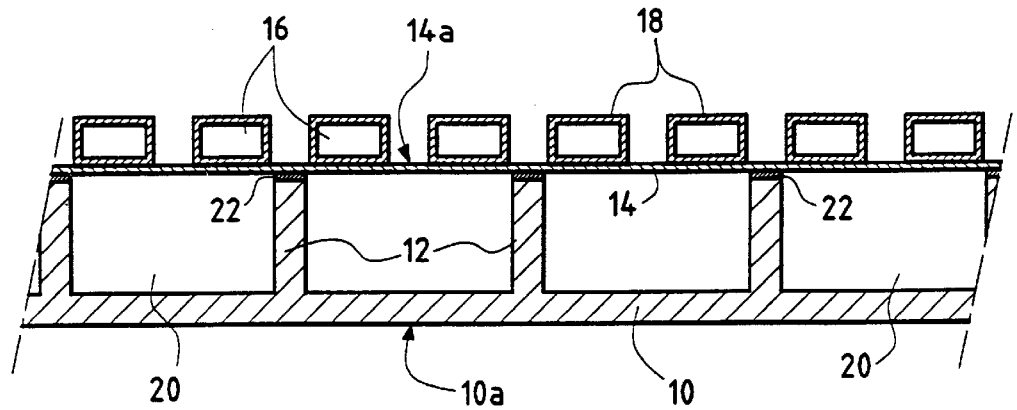
FIG. 1 is a cross-section view through an embodiment of a structural part in accordance with the invention.

FIG. 1 is a cross-section through a structural part comprising a thin plate or skin 10 of composite material, stiffeners 12 that are integral with the skin 10, that are situated on the rear face 10a thereof, and that are spaced apart from one another, and a metal wall 14 provided with passages 16 for circulating a cooling fluid, the metal wall 14 being fixed on the end edges of the stiffeners.

The piece comprising the plate 10 and the stiffeners 12 is made of a thermostructural composite material, in particular a C/C or a CMC composite material, e.g. a C/SiC composite material comprising carbon fiber reinforcement densified by a matrix of silicon carbide or essentially of silicon carbide. The presence of the stiffeners 12 makes it possible to impart a structural character to the structural part while nevertheless having a plate 10 and a metal wall 14 that are relatively thin, thereby ensuring that the final assembly thereof is of very low mass.

In the example shown, the stiffeners 12 are in the form of mutually parallel rectilinear ribs leaving gaps 20 between one another.

By way of example, the metal plate 14 is a thin plate of copper with pipes 18 forming the passages 16 being fixed to the rear face 14a thereof by welding.

In the example of FIG. 1, the metal wall 14 is fixed to the end edges of the stiffeners 12 by brazing. To this end, a layer of brazing alloy 22 is deposited on the end edges of the stiffeners, the metal wall 14 together with the pipes 18 is brought into contact with the stiffeners having the brazing alloy thereon, and the assembly is heated.

The discontinuity of the bonding to the metal wall and the distance between the bonding zone and the skin 10 which is exposed to the heat flux limit the thermo-mechanical stresses that result from the difference between the coefficients of thermal expansion of the thermostructural composite material constituting the stiffeners 12 and the metal constituting the wall 14, thereby simplifying the brazing process. In particular, it need not be necessary to metallize the edges of the stiffeners in order to improve adhesion of the brazing alloy.

Amongst the brazing alloys that can be used, mention can be made, for example, of the alloys sold under the name "Cu-ABA" or TiCuSil by the US company Wesgo, Inc.

Figure 2:
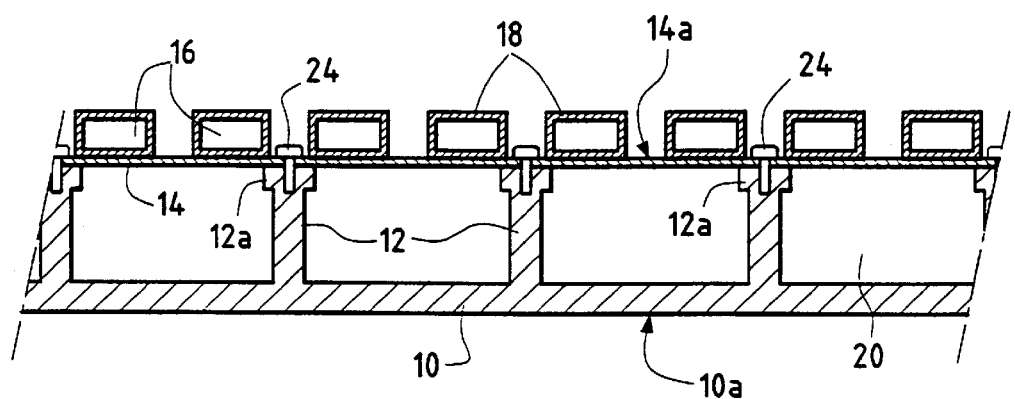
FIG. 2 is a cross-section view showing a variant embodiment of the FIG. 1 part.

In the example of FIG. 2, the metal wall 14 is fixed to the end edges of the stiffeners 12 by screws 24. By way of example, the screws can be made of a refractory metal, e.g. molybdenum or a molybdenum alloy, stainless steel, an alloy of nickel and cobalt, or a ceramic material. In order to be able to receive the screws 24, the end portions 12a of the stiffeners are preferably enlarged.

In use, the structural part is exposed to heat flux via the front face 10a of the skin 10. Heat transfer takes place by conduction through the skin 10 and then by radiation in the gaps 20 between the stiffeners 12 and towards the wall 14, with the heat then being taken up by the cooling fluid circulating in the passages 16.

There is practically no conduction along the stiffeners 12. In addition, because the skin 10 is thin, the material constituting the skin 10 and the stiffeners can be selected from materials that do not necessarily have a high coefficient of thermal conductivity. Depending on the application, and in particular depending on environmental conditions, it is thus possible to select C/C composite materials or CMCs, with CMCs being particularly suitable for use in an oxidizing atmosphere. Suitable CMCs include composite materials of C/SiC types.

Figure 3A:
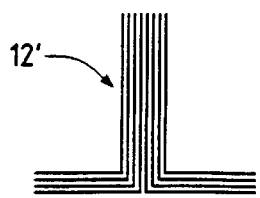
FIGS. 3A to 3C are diagrams showing successive steps in a first implementation of a method for preparing the piece made of thermostructural composite material of a structural part such as that shown in FIG. 1.
Figure 3B:
Figure 3C:
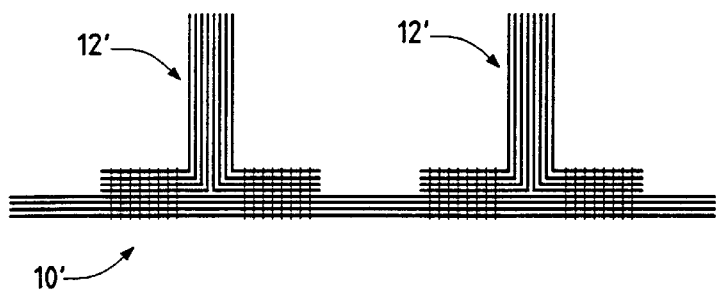

FIGS. 3A to 3C show a first implementation of a method of making an assembly comprising the skin 10 and the stiffeners 12.

Fiber preforms 10' and 12' (FIGS. 3A and 3B) are made separately for the skin 10 and for the stiffeners 12.

By way of example, the preforms 10' are obtained by superposing plies of fiber fabric, such as plies of cloth or felt, or unidirectional sheets of threads or cables superposed in different directions. The plies can be bonded together, e.g. by needling performed transversely relative to the plies.

The preforms 12' have a T-shaped cross-section. They can also be made by superposing plies of fiber fabric, with the plies being bent though a right angle. The preforms 12' can be kept in shape by consolidation. To this end, the plies are impregnated with a binder and they are maintained in the desired shape by means of tooling until the binder has consolidated. By way of example the binder can be a resin. The quantity of binder used is selected to be just sufficient to give the preforms enough mechanical strength to enable them to be handled.

The preforms 12' are assembled to the preform 10' (which could also be consolidated), e.g. by sewing or stitching (FIG. 3C).

Thereafter, the preforms are densified with the matrix of the thermostructural composite material. Densification techniques making use of gas (chemical vapor infiltration) or of liquid (impregnation with a precursor for the matrix followed by heat treatment) are well known for making C/C and CMC composites. The binder used for consolidating the preforms 12' and possibly also the preform 10' is either eliminated by the heat used during densification, or else it is transformed into a carbon residue, e.g. when the binder is a resin having a non-zero coke content.

Figure 4A:
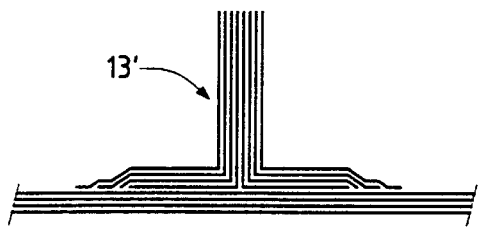
FIGS. 4A and 4B are diagrams showing the successive steps in a second implementation of a method for preparing the piece made of thermostructural composite material for a structural part such as that of FIG. 1.
Figure 4B:
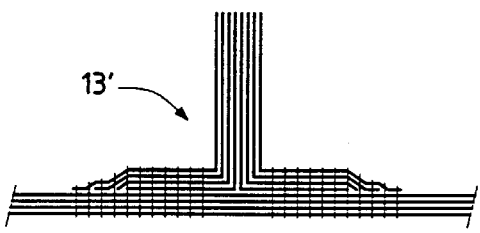

FIGS. 4A and 4B show another implementation of the assembly comprising the skin 10 and the stiffeners 12.

A fiber preform 13' having both preform portions for the skin 10 and for the stiffeners 12 is made directly by stacking plies of fiber fabric to which the necessary shapes and dimensions have been imparted (FIG. 4A).

The preform 13' can be consolidated mechanically by sewing and stitching (FIG. 4B) prior to being densified by the matrix of the composite material, or it can be densified directly. At least at the beginning of the densification process, the preform 13' is held in shape by means of tooling.

Figure 5A:
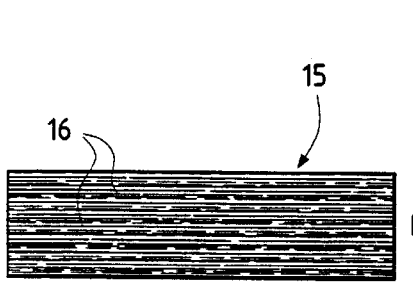
FIGS. 5A and 5B are diagrams showing successive steps in a third implementation of a method of preparing the piece made of thermostructural composite material for a structural part.
Figure 5B:
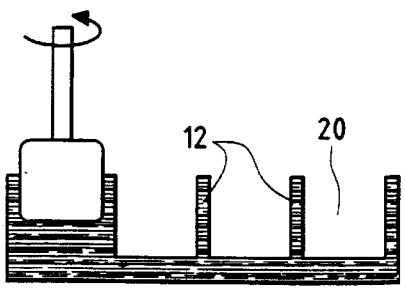

Finally, FIGS. 5A and 5B show another implementation of the assembly comprising the skin 10 and the stiffeners 12.

A blank 15 in the form of a thick plate of thermostructural composite material is made (FIG. 5A) by densifying plies of a fiber preform 16 made up of fiber fabric that is optionally bonded together by needling. In the example shown, the plies 16 are superposed flat.

The stiffeners 12 are formed by machining the gaps 20 (FIG. 5B).

This implementation presents the advantage of making the preform for the thermostructural composite material easier to manufacture, but has the drawback of giving rise to a large loss of material.

What is claimed is:

1. A structural part comprising a piece of thermostructural composite material connected to a metal wall provided with fluid circulation passages, wherein the composite material piece comprises:

a plate having a front face for exposure to a heat flux back face opposite said front face, and a plurality of stiffeners formed integrally with the plate and extending from the back face thereof, said stiffeners being spaced apart from one another and defining gaps therebetween over the whole height of the stiffeners between the back face of the plate and end edges of the stiffeners, and wherein the metal wall is fixed to the end edges of the stiffeners, whereby heat transfer between the plate and the metal wall principally takes place by radiation in said gaps.

2. A structural part according to claim 1, wherein the metal wall is fixed to the stiffeners by brazing.

3. A structural part according to claim 1, wherein the metal wall is fixed to the stiffeners by mechanical bonding means.

4. A structural part according to claim 1, wherein the thermostructural composite material is selected from carbon/carbon composite materials and ceramic matrix composite materials.

5. A structural part according to claim 4, wherein the thermostructural composite material is a composite material of the carbon/silicon carbide type.

6. A structural part according to claim 1, wherein the metal wall is a plate provided on one of its faces with pipes defining fluid circulation passages.

* * * * *

UNITED STATES PATENT AND TRADEMARK OFFICE
CERTIFICATE OF CORRECTION

PATENT NO. : 6,482,485 B1
DATED : November 19, 2002
INVENTOR(S) : Thierry Pichon It is certified that error appears in the above-identified patent and that said Letters Patent is hereby corrected as shown below:

<u>Column 5,</u>
Line 6, "flux back" should read -- flux and a back --.

Signed and Sealed this

Thirteenth Day of January, 2004

JON W. DUDAS
*Acting Director of the United States Patent and Trademark Office*